United States Patent
Batts et al.

(10) Patent No.: US 11,573,567 B2
(45) Date of Patent: Feb. 7, 2023

(54) AUTOMATED VEHICLE STEERING CONTROL FOR TRANSITIONING FROM MANUAL MODE TO AUTOMATED MODE

(71) Applicant: Motional AD LLC, Boston, MA (US)

(72) Inventors: Zachary T. Batts, Pittsburgh, PA (US); Ludong Sun, Pittsburgh, PA (US)

(73) Assignee: Motional AD LLC, Boston, MA (US)

(*) Notice: Subject to any disclaimer, the term of this patent is extended or adjusted under 35 U.S.C. 154(b) by 133 days.

(21) Appl. No.: 16/150,881

(22) Filed: Oct. 3, 2018

(65) Prior Publication Data

US 2020/0103896 A1  Apr. 2, 2020

Related U.S. Application Data

(60) Provisional application No. 62/740,126, filed on Oct. 2, 2018.

(51) Int. Cl.
*B60W 30/12* (2020.01)
*G05D 1/00* (2006.01)
*B60W 50/10* (2012.01)
*B60W 60/00* (2020.01)
*G06V 20/56* (2022.01)

(52) U.S. Cl.
CPC ........... *G05D 1/0061* (2013.01); *B60W 30/12* (2013.01); *B60W 50/10* (2013.01); *B60W 60/0051* (2020.02); *G05D 1/0088* (2013.01); *G06V 20/588* (2022.01); *G05D 2201/0213* (2013.01)

(58) Field of Classification Search
CPC ............... G05D 1/0061; G05D 1/0088; G05D 2201/0213; B60W 30/12; B60W 50/10; B60W 60/0051; G06K 9/00798
See application file for complete search history.

(56) References Cited

U.S. PATENT DOCUMENTS

| | | | |
|---|---|---|---|
| 2005/0115753 A1* | 6/2005 | Pemberton | G08G 1/164 180/167 |
| 2012/0283911 A1* | 11/2012 | Lee | B60W 30/12 701/41 |
| 2013/0190985 A1* | 7/2013 | Nakano | B62D 15/025 701/41 |
| 2017/0101094 A1* | 4/2017 | Fiaschetti | B62D 15/025 |
| 2018/0134290 A1* | 5/2018 | Kataoka | B60W 30/12 |
| 2018/0232585 A1* | 8/2018 | Kim | G05D 1/0088 |
| 2018/0281849 A1* | 10/2018 | Irie | B62D 6/008 |
| 2019/0086929 A1* | 3/2019 | Tamboli | G05D 1/0214 |

FOREIGN PATENT DOCUMENTS

KR   100857331 B1 *  9/2008  ............ B60W 30/12

* cited by examiner

*Primary Examiner* — Genna M Mott
(74) *Attorney, Agent, or Firm* — Fish & Richardson P.C.

(57) ABSTRACT

A system includes one or more sensor systems, a controller-circuit, a first module, and a second module. The sensor systems are configured to determine position relationship data between a roadway and a host vehicle. The sensor system includes at least one of a computer-vision system, a radar system, and a LIDAR system. The controller-circuit is configured to receive and transform the position relationship data to effect steering control of the host vehicle. The first module is controlled by the controller-circuit to effect the steering control when the steering control transitions from a manual-mode to an automated mode. The second module is controlled by the controller-circuit to effect steering control of the host vehicle after control by the first module and upon meeting a prescribed condition.

15 Claims, 3 Drawing Sheets

AUTOMATED VEHICLE STEERING CONTROL FOR TRANSITIONING FROM MANUAL MODE TO AUTOMATED MODE

CROSS-REFERENCES TO RELATED APPLICATIONS

This patent application claims priority to U.S. Provisional Patent Application Ser. No. 62/740,126, filed Oct. 2, 2018 which is incorporated herein by reference in its entirety.

TECHNICAL FIELD

The present disclosure relates to autonomous vehicles, and more particularly, to a vehicle steering control system configured to effect transitioning from a manual mode to an automated mode of operation.

SUMMARY

A system according to one, non-limiting, embodiment of the present disclosure includes one or more sensor systems, a controller-circuit, a first module, and a second module. The sensor systems are configured to determine position relationship data between a roadway and a host vehicle. The sensor system includes at least one of a computer-vision system, a radar system, and a LIDAR system. The controller-circuit is configured to receive and transform the position relationship data to effect steering control of the host vehicle. The first module is controlled by the controller-circuit to effect the steering control when the steering control transitions from a manual-mode to an automated mode. The second module is controlled by the controller-circuit to effect steering control of the host vehicle after control by the first module and upon meeting a prescribed condition.

A method according to another, non-limiting, embodiment includes receiving a request to transition to an autonomous mode while driving in a manual mode. Upon receiving the request, the system effects the transition from the manual mode to autonomous mode of a host vehicle. During this transition, one or more sensor systems generate position relationship data. The position relationship data is then received by a controller-circuit. The controller-circuit processes the position relationship data to determine a position of the host vehicle with respect to a lane in which the host vehicle is currently traveling. The position relationship data is initially processed by a first algorithm executed by the controller-circuit to steer the host vehicle to a center of the lane. The controller-circuit determines if a predetermined condition is met. Upon the determination that the predetermined condition is met, the controller-circuit processes the position relationship data by a second algorithm executed by the controller-circuit to maintain the host vehicle position at the center.

A non-transient computer readable medium according to another, non-limiting, embodiment includes program instructions for causing a system to perform a method of operation. The method includes receiving a request to transition to an autonomous mode while driving in a manual mode. Upon receiving the request, the system effects the transition from the manual mode to autonomous mode of a host vehicle. During this transition, one or more sensor systems generate position relationship data. The position relationship data is then received by a controller-circuit. The controller-circuit processes the position relationship data to determine a position of the host vehicle with respect to a lane in which the host vehicle is currently traveling. The position relationship data is initially processed by a first algorithm executed by the controller-circuit to steer the host vehicle to a center of the lane. The controller-circuit determines if a predetermined condition is met. Upon the determination that the predetermined condition is met, the controller-circuit processes the position relationship data by a second algorithm executed by the controller-circuit to maintain the host vehicle position at the center.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
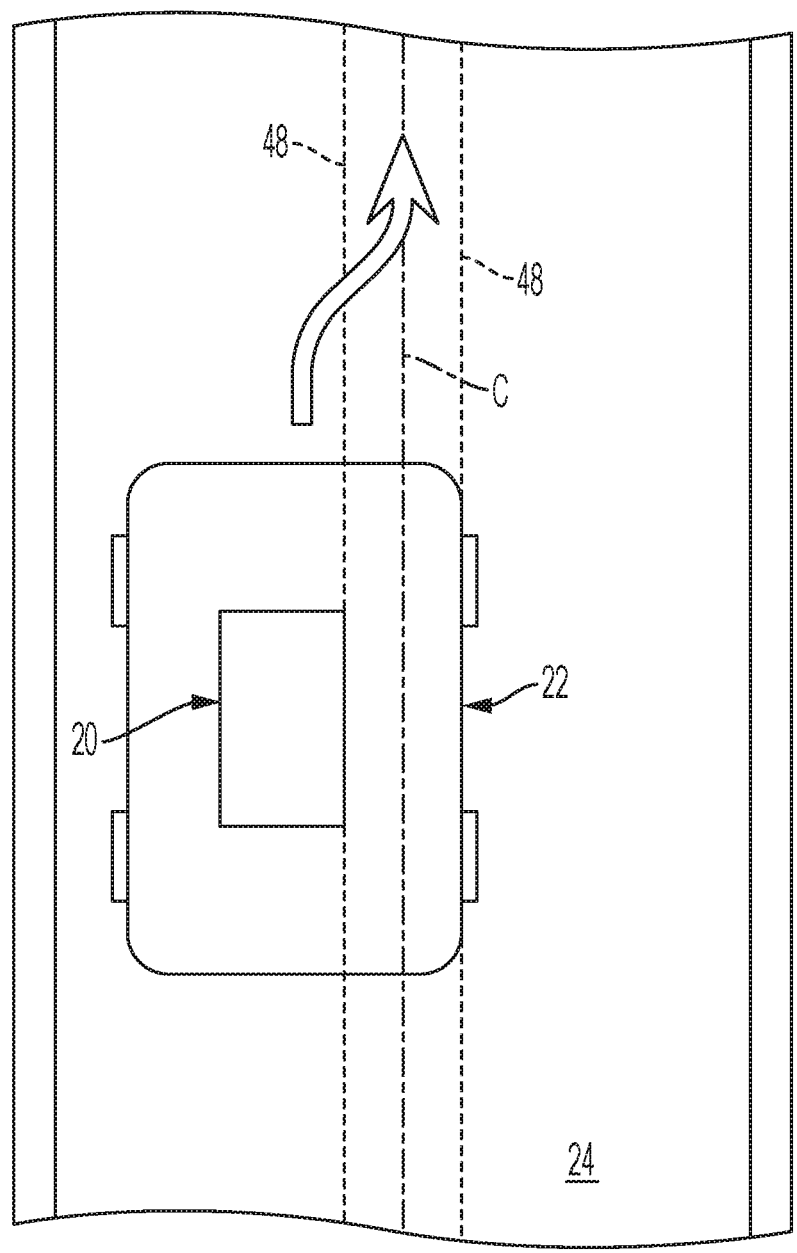
FIG. 1 is a plan view of a roadway with a host vehicle that applies a vehicle steering control system as one exemplary embodiment of the present disclosure.

Referring to FIG. 1, a vehicle steering control system 20 processes lane position of a host vehicle 22 and effects steering of the host vehicle 22 when operated in an automated mode and permits a human operator to steer the host vehicle 22 in a manual mode. The system 20 applies a feedback control logic (i.e., PID algorithm) when the steering initially transitions from the manual mode to the automated mode, and then applies a neural-network algorithm to steer the host vehicle 22 to a desired position within a roadway or lane 24 (i.e. travel lane). In one embodiment, the desired roadway position is centered to a centerline C of the lane 24 (i.e., lane center). In one example, the host vehicle 22 is an autonomous vehicle that can be driven in a manual mode.

Figure 2:
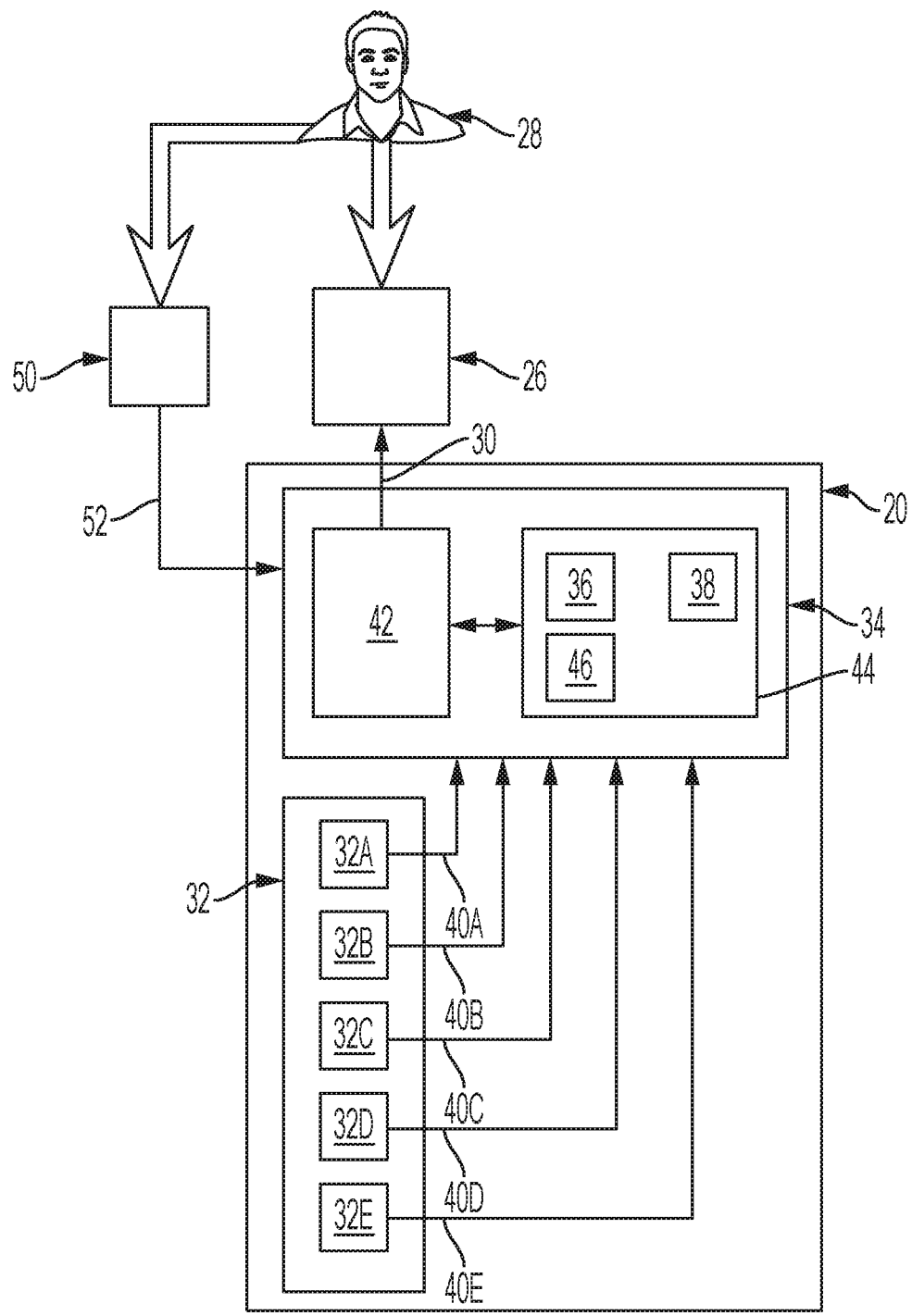
FIG. 2 is a schematic of the vehicle steering control system.

Referring to FIG. 2, the host vehicle 22 includes a steering device 26 adapted to be manually operated by the human operator 28 when the host vehicle 22 is operated in a manual mode, and receive steering command signals (see arrow 30) when the host vehicle 22 is operated in an automated mode. The steering control system 20 includes one or more sensor systems 32, a controller-circuit 34, a first module 36, and a second module 38. The one or more sensor systems 32 are configured to determine position relationship data between the roadway 24 and the host vehicle 22. The one or more sensor systems 32 include at least one of a computer-vision system 32A, a radar system 32B, a LIDAR system 32C, a satellite-based or global positioning system 32D, and a localization system 32E (e.g., local beacons). Each system 32A-E is configured to send respective signals (see arrows 40A, 40B, 40C, 40D, 40E) indicative of the vehicle position relationship data, to the controller-circuit 34. The controller-circuit 34 is configured to receive and transform the signals 40A, 40B, 40C to effect automated steering control of the host vehicle 22.

It is contemplated and understood that in one embodiment, the global positioning system 32D and/or the localization system 32E are part of the vehicle steering control system 20. In another embodiment, the global positioning system 32D and/or the localization system 32E is not part of vehicle steering control system 20, but the controller-circuit 34 of the system 20 is configured to receive and process the respective signals 40D, 40E.

The controller-circuit 34 includes one or more processors 42 (i.e., one illustrated) and one or more non-transient storage mediums 44 (i.e., one illustrated). In one example, the processor 42 is a microprocessor or other control circuitry such as analog and/or digital control circuitry including an application specific integrated circuit (ASIC) for processing data as is known by one with skill in the art. In one example, the storage medium 44 of the controller-circuit 34 is non-volatile memory, such as electrically erasable programmable read-only memory (EEPROM) for storing one or more routines, thresholds, and captured data, hereafter referred to as modules. In one example, the modules 36, 38 are executed by one or more of the processors 42 to enable operation, or functioning, of the vehicle steering control system 20.

In one example, the first module 36 includes at least one of computer instructions, a feedback algorithm, a proportional-integral-derivative controller, and an ASIC. The second module 38 includes at least one of computer instructions, a neural-network algorithm, and an ASIC.

In one example, the controller-circuit 34 is configured to receive and transform the position relationship data to effect steering control of the host vehicle 22. The first module 36 is controlled by the controller-circuit 34 to effect the steering control when the steering control transitions from a manual-mode to an automated mode. The second module 38 is controlled by the controller-circuit 34 to effect steering control of the host vehicle 22 after control by the first module 36 and upon meeting a prescribed condition.

In one example, the first and second modules 36, 38 are stored in the storage medium 44 and executed by the processor 42. The first module 36 is configured to apply a feedback control algorithm, and thereby effect the steering control of the steering device 26 when the control initially transitions from the manual mode to the automated mode. Use of the first module 36 may be particularly effective, or useful, when the host vehicle 22 is far off-center from the lane 24. The second module 38 is executed by the processor 42 after execution of the first module 36, and when the processor determines that a prescribed condition 46 is met. In one embodiment, the second module 38 applies a neural network algorithm, and thereby effects the steering control of the steering device 26.

The feedback control algorithm is at least one of a proportional-integral-derivative, a path tracking algorithm that computes an angular velocity command that moves the host vehicle 22 from a current position to a look-ahead position (e.g., Pure Pursuit), and any algorithm configured to continuously calculate an error value as the difference between a desired setpoint associated with the centerline C and a measured process variable associated with the current position relationship data. The neural network algorithm is at least one of a model predictive control, an H-Infinity control, a feedback linearization control, and a model used to estimate functions dependent upon multiple inputs.

In one embodiment, the prescribed condition 46 is pre-programmed into, and stored by, the storage medium 44. In one example, the prescribed condition 46 is a threshold associated with respect to a boundary 48 (see FIG. 1) of the travel lane 24. For example, the threshold or boundary 48 is a distance of about one half meters (0.5 m) from lane centerline C. In another example, the prescribed condition 46 is a pre-determined time period. That is, the first module 36 assumes steering control for the pre-determined time period, then the second module 38 assumes control after the expiration of the time period.

Figure 3:
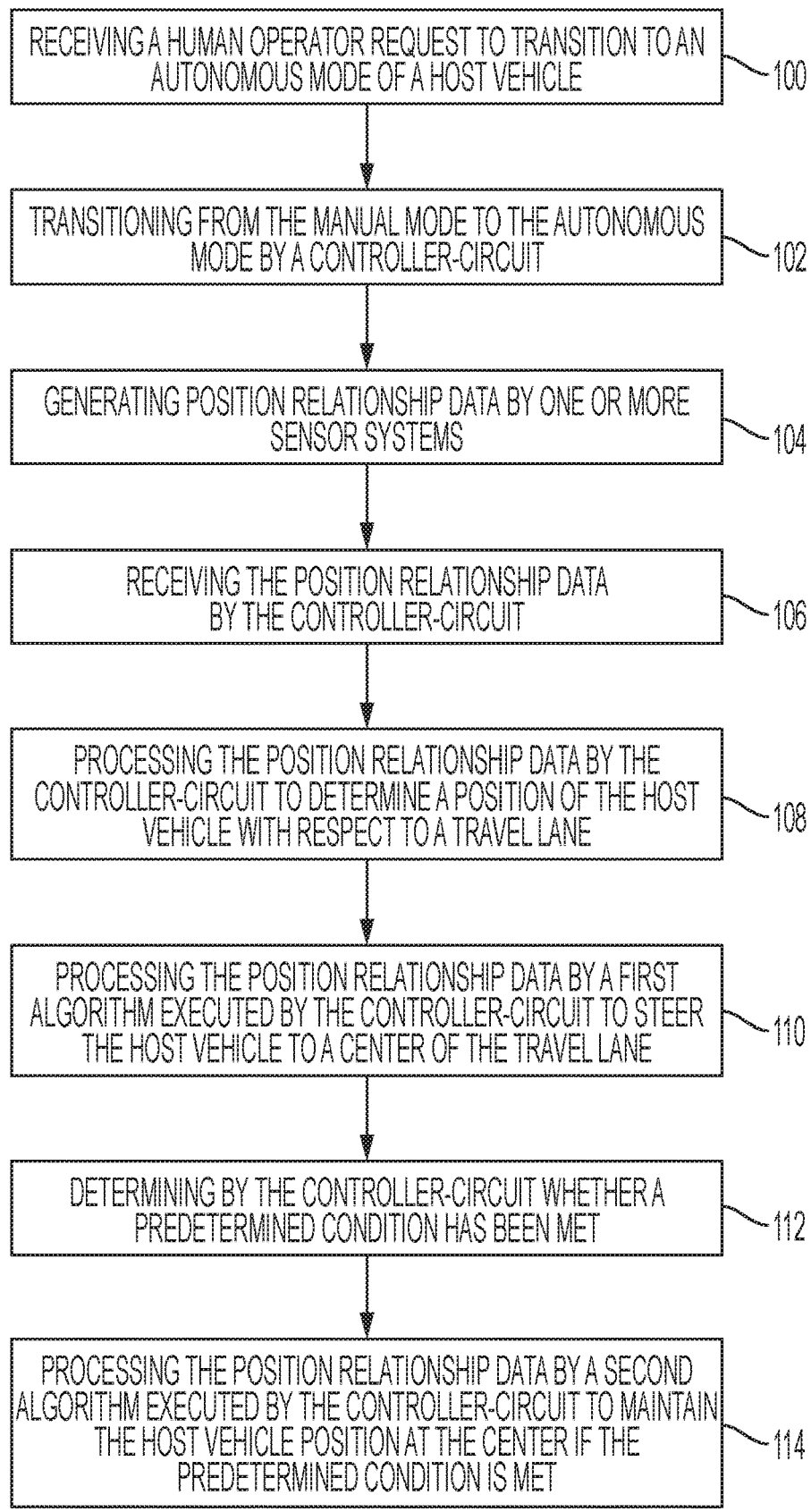
FIG. 3 is a flow chart of a method of operating the vehicle steering control system.

Referring to FIG. 3, a method of operating the vehicle steering control system 20 is illustrated. At block 100 the vehicle operator 28 utilizes a user interface 50 (see FIG. 2) to enter a request to change from the manual mode to the automated mode of vehicle operation while driving in the manual mode. In one example, the user interface 50 includes a touch screen for entry of the request, is adapted to accept audible requests, and/or accepts any other actions or gestures on the part of the vehicle operator 28. Upon receiving the request from the operator 28, the user interface 50 outputs a command, or initiation, signal (see arrow 52) to the controller-circuit 34. Upon receiving the signal 52, the controller-circuit 34 begins the transition to the automated, or autonomous, mode.

At block 102, the vehicle steering control system 20 transitions from the manual mode to the autonomous mode of the host vehicle 22. At block 104, the one or more sensor systems 32 generate the position relationship data and outputs this data in the form of at least one of the signals 40A-E. At block 106, the controller-circuit 34 receives the position relationship data from the one or more sensor systems 32. At block 108, the processor 42 of the controller-circuit 34 processes the position relationship data to determine a position of the host vehicle 22 with respect to the lane 24 in which the host vehicle 22 is currently traveling.

At block 110, the processor 42 of the controller-circuit 34 processes the position relationship data by executing a first algorithm of the first module 36. The controller-circuit 34 outputs a command signal 30 indicative of the transformation of the position relationship data to the steering device 26. In compliance with the command signal 30, the steering device 26 steers the vehicle to the center of the lane 24.

At block 112, the processor 42 of the controller-circuit 34 determines if a predetermined condition has been met. If not, the controller-circuit 34 continues to process the position relationship data via the first module 36. At block 114, and if the predetermined condition has been met, the current position relationship data is processed by the processor 42 utilizing the second algorithm of the second module 38 to maintain the position of the host vehicle 22 substantially along the centerline C of the lane 24. As previously described, and in one example, the predetermined condition is a threshold position with respect to the lane centerline C. In another example, the predetermined condition is a time period.

Benefits and advantages of the present disclosure include a vehicle capable of operating with less aggressive vehicle maneuvers when transitioning from a manual mode to an automated mode of operation. One example of a vehicle maneuver is the automated centering of the vehicle to a lane during the mode transitioning period.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other non-transitory forms.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. An application running on a server and the server, may be a component. One or more applications may reside within a process and/or thread of execution and an application may be localized on one computer and/or distributed between two or more computers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system comprising:
   one or more sensor systems configured to determine position relationship data between a roadway and a host vehicle, the one or more sensor systems including at least one of a computer-vision system, a radar system, and a LIDAR system;
   a controller-circuit configured to:
     receive and transform the position relationship data to effect steering control of the host vehicle;
     execute a first steering control algorithm that controls steering to initiate a transition from a manual mode to an autonomous mode by adjusting a position of the host vehicle to be within a threshold associated with a boundary of a travel lane based on the position relationship data; and
     execute a second steering control algorithm that controls steering by maintaining the host vehicle position relative to the boundary of the travel lane based on the position relationship data after steering control by the first steering control algorithm and upon identification that the host vehicle is within the threshold associated with a boundary of a travel lane.

2. The system set forth in claim 1, wherein the first algorithm includes at least one of computer instructions, a feedback algorithm or a proportional-integral-derivative controller, and the second algorithm includes at least one of computer instructions or a neural-network algorithm.

3. The system set forth in claim 2, wherein the neural-network algorithm is configured to be at least one of a model predictive control, an H-Infinity control, a feedback linearization control, and or a model used to estimate functions dependent upon multiple inputs, and the feedback algorithm is configured to be at least one of a proportional-integral-derivative, Pure Pursuit, and or any algorithm configured to continuously calculate an error value as a difference between a desired setpoint and the position relationship data.

4. The system set forth in claim 1, wherein the boundary is a lane center and the threshold is about 0.5 meters from the lane center.

5. The system set forth in claim 1, wherein the controller-circuit includes one or more processors and one or more non-transient storage mediums.

6. The system set forth in claim 1, wherein the one or more sensor systems include a global positioning system.

7. The system set forth in claim 1, wherein the one or more sensor systems include a localization system.

8. A method comprising:
   while driving in a manual mode of a host vehicle, receiving a request to transition to an autonomous mode;
   in response to receiving the request, transitioning from the manual mode to the autonomous mode of the host vehicle;
   generating position relationship data by one or more sensor systems;
   receiving the position relationship data by a controller-circuit;
   processing the position relationship data by the controller-circuit to determine a position of the host vehicle with respect to a lane in which the host vehicle is currently traveling;
   processing the position relationship data by executing a first steering control algorithm that steers the host vehicle to within a threshold associated with a boundary of a travel lane;
   determining, by the controller-circuit, whether the host vehicle is within the threshold associated with a boundary of a travel lane; and
   in accordance with a determination by the controller-circuit that the host vehicle is within the threshold associated with a boundary of a travel lane, processing the position relationship data by executing a second steering control algorithm after the first steering control algorithm steers the host vehicle to within a threshold associated with a boundary of a travel lane, wherein the second steering control algorithm maintains the host vehicle position relative to the boundary of the travel lane.

9. The method set forth in claim 8, wherein the first algorithm is configured to continuously calculate an error value as the difference between a desired setpoint and a measured process variable associated with the position relationship data.

10. The method set forth in claim 8, wherein the second algorithm is a neural-network algorithm.

11. The method set forth in claim 8, wherein the controller-circuit includes one or more processors and one or more non-transient storage mediums.

12. A non-transient computer readable medium containing program instructions for causing a system to perform the method of:
   while driving in a manual mode of a host vehicle, receiving a request to transition to an autonomous mode;
   in response to receiving the request, transitioning from the manual mode to the autonomous mode of the host vehicle;
   generating position relationship data by one or more sensor systems;
   receiving the position relationship data by a controller-circuit;
   processing the position relationship data by the controller-circuit to determine a position of the host vehicle with respect to a lane in which the host vehicle is currently traveling;
   processing the position relationship data by executing a first steering control algorithm that steers the host vehicle to within a threshold associated with a boundary of a travel lane;
   determining, by the controller-circuit, whether the host vehicle is within the threshold associated with a boundary of a travel lane; and
   in accordance with a determination by the controller-circuit that the host vehicle is within the threshold associated with a boundary of a travel lane, processing the position relationship data by executing a second steering control algorithm after the first steering control algorithm steers the host vehicle to within a threshold associated with a boundary of a travel lane, wherein the second steering control algorithm maintains the host vehicle position relative to the boundary of the travel lane.

13. The non-transient computer readable medium in claim 12, wherein the first algorithm is configured to continuously calculate an error value as the difference between a desired setpoint and a measured process variable associated with the position relationship data.

14. The non-transient computer readable medium set forth in claim 12, wherein the second algorithm is a neural-network algorithm.

15. The non-transient computer readable medium set forth in claim 12, wherein the controller-circuit includes one or more processors and one or more non-transient storage mediums.

\* \* \* \* \*

UNITED STATES PATENT AND TRADEMARK OFFICE
CERTIFICATE OF CORRECTION

| | | |
|---|---|---|
| PATENT NO. | : 11,573,567 B2 | Page 1 of 1 |
| APPLICATION NO. | : 16/150881 | |
| DATED | : February 7, 2023 | |
| INVENTOR(S) | : Zachary Thomas Batts and Ludong Sun | |

It is certified that error appears in the above-identified patent and that said Letters Patent is hereby corrected as shown below:

In the Claims

Column 6, Line 28, In Claim 3, delete "and or" and insert -- or --.

Column 6, Line 31, In Claim 3, delete "and or" and insert -- or --.

Signed and Sealed this
Twenty-ninth Day of August, 2023

*Katherine Kelly Vidal*

Katherine Kelly Vidal
*Director of the United States Patent and Trademark Office*